United States Patent [19]

Costen

[11] 4,026,527

[45] May 31, 1977

[54] VORTEX GENERATOR FOR CONTROLLING THE DISPERSION OF EFFLUENTS IN A FLOWING LIQUID

[75] Inventor: Robert C. Costen, Hampton, Va.

[73] Assignee: The United States of America as represented by the Administrator of the National Aeronautics and Space Administration, Washington, D.C.

[22] Filed: May 3, 1976

[21] Appl. No.: 682,416

[52] U.S. Cl. .............................. 259/4 R; 261/123; 261/DIG. 75
[51] Int. Cl.² ........................................ B01F 15/00
[58] Field of Search ............... 259/4 R, 2, 18, 36; 261/DIG. 75, 123, 76

[56] References Cited

UNITED STATES PATENTS

| 2,918,263 | 12/1959 | Eichhorn | 259/4 R |
| 3,236,767 | 2/1966 | Ross | 261/123 X |
| 3,306,342 | 2/1967 | DiSalvo | 259/4 R |
| 3,452,966 | 7/1969 | Smolski | 261/123 X |

Primary Examiner—Edward J. McCarthy
Attorney, Agent, or Firm—Howard J. Osborn; Wallace J. Nelson; John R. Manning

[57] ABSTRACT

A method is disclosed for controlling the dispersion of effluents in a flowing liquid. A vortex generator for creating a distinct recirculating vortical flow is disposed in a flowing liquid and effluents are discharged into the vortical flow. The effluents are entrained in the vortical flow and by selectively positioning the vortex generator the dispersion of the entrained effluents can be controlled.

9 Claims, 3 Drawing Figures

VORTEX GENERATOR FOR CONTROLLING THE DISPERSION OF EFFLUENTS IN A FLOWING LIQUID

ORIGIN OF THE INVENTION

The invention described herein was made by an employee of the United States Government and may be manufactured and used by or for the Government for governmental purposes without the payment of any royalties thereon or therefor.

DESCRIPTION OF THE PRIOR ART

In many situations it is necessary to discharge an effluent into a flowing liquid. For example, municipalities discharge sewage into rivers; industry disposes of industrial waste in the same manner; and some experimental procedures require an effluent or dye to be introduced into a flowing liquid.

Present methods and procedures provide control of the effluent dispersion only at the discharge point; however, in the examples given above it may be necessary to exert control over the effluent's dispersion for some distance beyond the discharge point. Such controls may be necessary to direct the effluent away from stagnant areas where the effluent may become concentrated, or to direct the effluent toward the free surface of a flowing liquid where air and sun can interact with the effluent.

It is therefore an object of the present invention to provide a method for controlling the dispersion of an effluent after it has been introduced into a flowing liquid.

A further object of the present invention is a method for selectively directing the flow of an effluent in a flowing liquid.

A still further object of the present invention is a method for rapidly dispersing an effluent at the discharge point, or at some point downstream of the discharge point.

These and other objects of the invention will be readily apparent when considered in reference to the following description and claims and when taken in connection with the attached drawings to which they relate.

SUMMARY OF THE INVENTION

According to the present invention a vortex generator is disposed in a flowing liquid having a free surface such as a river or stream, or alternatively being contained as in a pipe or tube. In either case the vortex generator creates a distinct recirculating vortical flow in the flowing liquid such that the water particles in the vortical flow and in the surrounding liquid remain separate and do not mix with each other. That is, the water particles which are part of the vortical flow remain in the vortex and those water particles which are not in the vortex are not drawn into it. In short the vortex is isolated from the surrounding liquid and there is no flow either into or out of the vortex once it is established.

One embodiment of the invention uses a hydrofoil disposed in the flowing liquid to generate the vortex. It is well known that a fluid flowing past a wing-like structure, such as a hydrofoil, will generate a vorticle flow at the tips of the structure. Thus by positioning a hydrofoil in a flowing liquid vortices will be generated at the tips of the hydrofoil by the flow of the liquid over the hydrofoil.

The strength and duration of the vortical flow created at the tips of the hydrofoil will depend upon a number of factors such as the speed and turbulence of the flowing liquid and the lift coefficient of the hydrofoil. The vortex maintains constant strength downstream of the hydrofoil until it degenerates.

An effluent is introduced into the vortex where it is entrained within the recirculating vortical flow and carried downstream. Since, as pointed out above, the water particles of the liquid and the particles of the vortical flow do not mix there is no dispersion of the effluent into the surrounding liquid.

The hydrofoil is affixed to a pivotal and rotatable base which permits the hydrofoil to be selectively positioned with respect to the direction of flow of the liquid. By pivoting and rotating the base, the orientation of the hydrofoil is changed thereby changing the direction of the vortex and the entrained effluent with respect to the direction of flow of the surrounding liquid.

DESCRIPTION OF THE INVENTION

Figure 1:
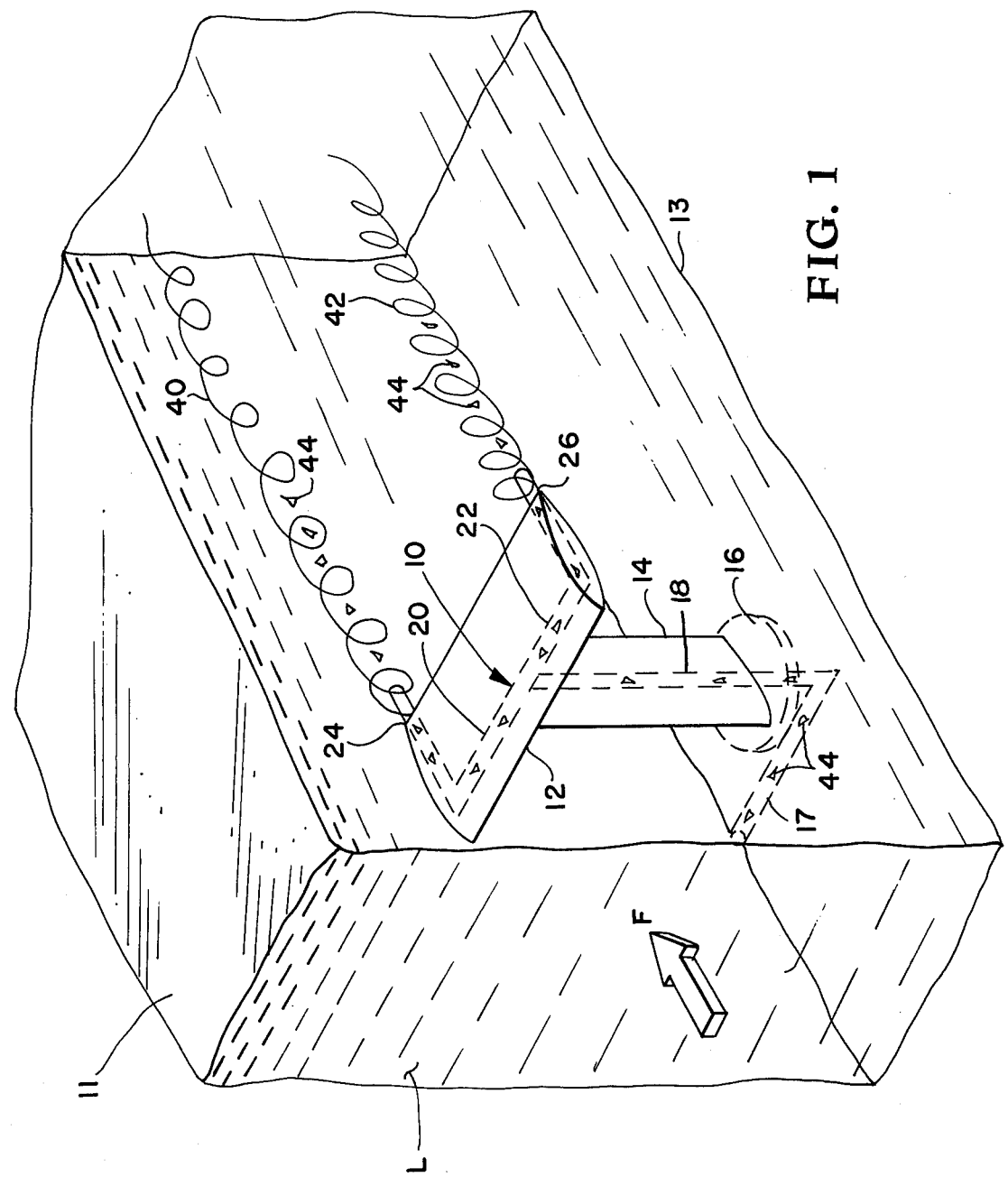
FIG. 1 — detailed perspective view of the present invention.

Referring now to the drawings, there is shown an embodiment of the present invention as it would be used to control the dispersion of an effluent in a flowing liquid. As best seen in FIG. 1 a vortex generally designated by number 10 is disposed in flowing liquid L the direction of flow of which is shown by arrow F. Flowing liquid L has a lower boundary 13 and an upper boundary 11.

According to the illustrated embodiment vortex generator 10 is a hydrofoil 12 supported generally parallel to upper boundary 11 by strut 14. Hydrofoil 12 is a wing-like structure manufactured from any suitable corrosion resistant material such as stainless steel or the like. Strut 14 is likewise manufactured from a corrosion resistant material and is rigidly affixed to a rotatable and pivotable disk 16. In the FIG. 1 embodiment strut 14 is made streamlined to minimize the turbulence created in flowing liquid L.

Figure 3:
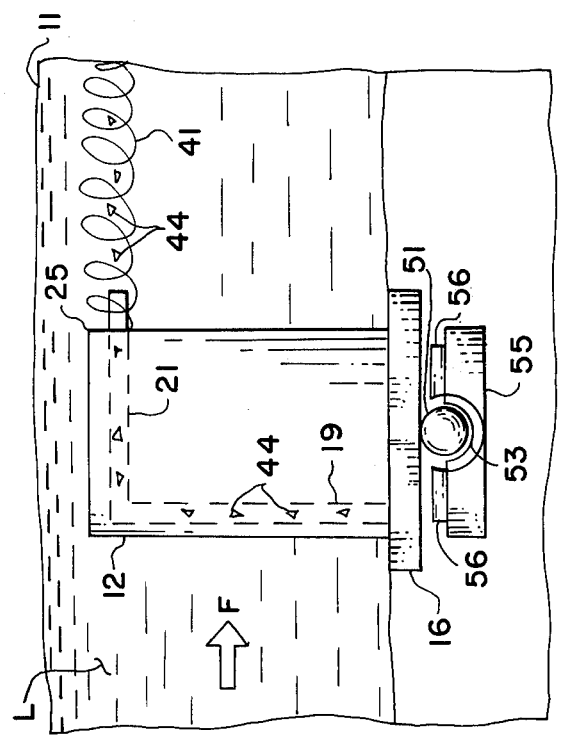
FIG. 3 — overall persective view of present invention.

Pipe 17 carries effluent 44 from an effluent source which may be an industrial plant or any other source such as a simple storage container (See FIG. 3). Pipe 17 and disk 16 are positioned below lower boundary 13 so as to minimize turbulence in flowing liquid L. Pipe 17 communicates with riser 18 which is positioned inside strut 14 and riser 18 in turn communicates with branches 20 and 22 which terminate respectively at tips 24 and 26 of hydrofoil 12.

Figure 2:
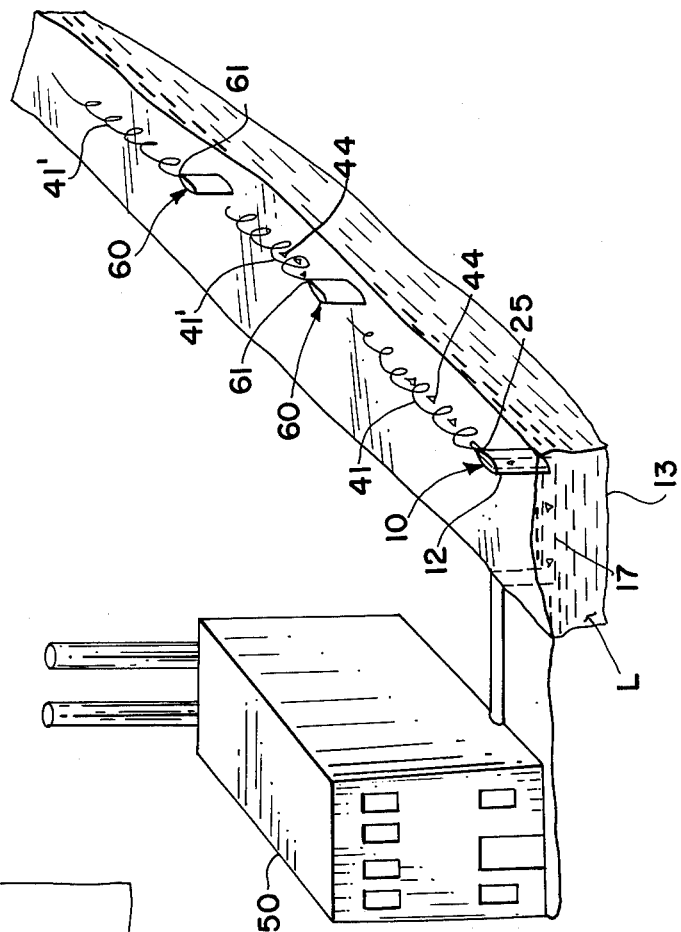
FIG. 2 — side view of alternative embodiment of present invention.

Referring briefly to FIG. 2 there is shown an alternative embodiment of the present invention whereby hydrofoil 12 is disposed in flowing liquid L generally perpendicular to upper boundary 13. Vortex 41 is created in the same manner as previously detailed and effluent 44 flows through pipe 19 and into arm 21 which terminate at tip 25 of hydrofoil 12. As previously discussed effluent 44 is entrained in vortex 41 the direction of which is changed by moving rotatable and pivotable disk 16. Many methods of making disk 16 both rotatable and pivotable will suggest themselves to one skilled in the mechanical arts and FIG. 2 illustrates a ball and socket arrangement which is used in the described embodiments. A ball 51 is rigidly affixed to disk 16 and fits into a mating depression 53 in plate 55.

Vortex generator 10 may be duplicated according to the foregoing discussion and a plurality of secondary vortex generators 60 disposed in flowing liquid L as shown in FIG. 3.

Disk 16 is rotated and pivoted by any suitable means such as by the use of electric motors which drive simple gearing arrangements (not shown). A brake or clamp 56 is provided on plate 55 and serves to hold hydrofoil 12 in the desired position so that the force of flowing liquid L will not displace hydrofoil 12.

OPERATION

The operation of the invention is described with reference to FIG. 1. As liquid L flows over hydrofoil 12 two vortices 40 and 42 are created respectively at tips 24 and 26 hydrofoil 12. The vortices 40 and 42 are a distinct self-contained recirculating flow within flowing liquid L. Thus there is no flow either into or out of vortices 40 and 42. Effluent 44 flows through riser 18 into arms 20 and 22 and is introduced into vortices 40 and 42 at tips 24 and 26 hydrofoil 12. Vortices 40 and 42 entrain effluent 44 and prevent it from mixing with flowing liquid L.

By changing the orientation of hydrofoil 12 effluent 44 can be selectively directed downstream. For example the effluent 44 could be directed toward upper boundary 11 where, if flowing liquid L were a river, sun and air could be used to help purify effluent 44.

To further extend control over the effluent 44 a plurality of secondary vortex generators 60 may be provided in flowing liquid L as shown in FIG. 3. The effluent 44 is pumped from industrial facility 50 through pipes 17 and 19 into vortex 41 created by vortex generator 10. Secondary vortex generators 60 are disposed in liquid L with their tips 61 in vortex 41 thereby regenerating the vortex 41 as secondary vortex 41'. Secondary vortex 41' will further entrain effluent 44 and carry it further downstream. Secondary vortex generators 60 may have an orientation different from vortex generator 10 causing a change in direction of the flow of effluent 44 at secondary generator 60. Further, secondary generator 60 may be made to have a constantly varying orientation thereby providing rapid dispersion of the effluent at secondary generator 60. Such oscillation may be provided in a number of ways such as by a simple motor and offset pivot arrangement (not shown).

It will be understood that the foregoing description is of the preferred embodiment of the invention and is therefore merely representative. Obviously, there are many variations and modifications of the present invention in light of the above teachings. It is to be understood that within the scope of the appended claims the invention may be practiced otherwise than as specifically described.

What is claimed is:

1. A method for controlling the dispersion of effluents in a flowing liquid comprising the steps of:
   providing a body of flowing liquid having an upper boundary and a lower boundary;
   providing a first vortex generator for creating a distinct self-contained recirculating first vortical flow in said liquid wherein there is essentially no liquid flow between said body of flowing liquid and said first vortical flow;
   locating said first vortex generator in said flowing liquid thereby generating said first vortical flow;
   injecting an effluent into said first vortical flow where it is entrained and carried downstream without dispersing into said flowing liquid until said first vortical flow has dissipated.

2. The method of claim 1 comprising the further step of providing a first vortex generator which is a hydrofoil.

3. The method of claim 2 comprising the further step of providing a strut means for supporting said hydrofoil in a generally parallel orientation with respect to said upper boundary of said flowing liquid.

4. The method of claim 2 comprising the further step of disposing said hydrofoil generally transverse to said upper boundary.

5. The method of claim 1 comprising the further steps of: providing a means for selectively varying the orientation with respect to the flow of said flowing fluid of said first vortex generator; orienting said first vortex generator so as to selectively direct said first vortical flow.

6. The method of claim 5 comprising the further step of directing said first vortical flow toward said upper boundary of said flowing fluid.

7. The method of claim 1 comprising the further step of providing downstream of said first vortex generator a secondary vortex generator disposed within said first vortical flow.

8. The method of claim 7 comprising the further step of providing said secondary vortex generators with an oscillating means for varying the orientation of said secondary vortex generators thereby causing a rapid dispersal of the effluent.

9. The method of claim 7 comprising the further step of providing a plurality of downstream vortex generators downstream of said secondary vortex generator.

* * * * *